US012589330B2

(12) United States Patent　　　　　(10) Patent No.:　US 12,589,330 B2

Miller et al.　　　　　　　　　　　　(45) Date of Patent:　　Mar. 31, 2026

(54) MODIFIED COLUMN FOR EXPANDED BED ADSORPTION AND METHODS OF USE THEREOF

(71) Applicant: Evolve Biologics Inc., Mississauga (CA)

(72) Inventors: David Miller, Guelph (CA); Gillian Vanderlee, Toronto (CA); Hrvoje Beg, Toronto (CA); Aryn Holness, Toronto (CA)

(73) Assignee: Evolve Biologics Inc., Mississauga (CA)

( * ) Notice: Subject to any disclaimer, the term of this patent is extended or adjusted under 35 U.S.C. 154(b) by 620 days.

(21) Appl. No.: 17/782,821

(22) PCT Filed: Dec. 4, 2020

(86) PCT No.: PCT/CA2020/051663

§ 371 (c)(1),
(2) Date: Jun. 6, 2022

(87) PCT Pub. No.: WO2021/108914

PCT Pub. Date: Jun. 10, 2021

(65) Prior Publication Data

US 2023/0001328 A1　　　Jan. 5, 2023

Related U.S. Application Data

(60) Provisional application No. 62/944,579, filed on Dec. 6, 2019.

(51) Int. Cl.
B01D 15/22　　　(2006.01)
B01D 15/18　　　(2006.01)
(Continued)

(52) U.S. Cl.
CPC ......... B01D 15/22 (2013.01); B01D 15/1821 (2013.01); G01N 30/58 (2013.01); G01N 30/6065 (2013.01)

(58) Field of Classification Search
CPC .... B01D 15/22; B01D 15/12; B01D 15/1821; B01D 15/1807; B01D 15/18; B01D 15/00;
(Continued)

(56) References Cited

U.S. PATENT DOCUMENTS 4,032,407 A　　6/1977　Scott et al.
4,284,511 A　　8/1981　Weitzen et al.
(Continued)

FOREIGN PATENT DOCUMENTS

CA　　　3097021 A1　　10/2019
CN　　101690854 A　　8/2011
(Continued)

OTHER PUBLICATIONS

International Preliminary Report on Patentability (IPRP), as received in connection to International Patent Application No. PCT/CA2020/051663, mailed on Jun. 16, 2022.

*Primary Examiner* — Akash K Varma
(74) *Attorney, Agent, or Firm* — SMART & BIGGAR LP

(57) ABSTRACT

The present disclosure provides chromatography columns and methods of chromatographic separation using the same. In particular, the disclosure provides modified columns where the cross-sectional area of the column increases in an area near the end of the column in a flared manner. The modified columns can be used in Expanded Bed Absorption (EBA) systems.

11 Claims, 17 Drawing Sheets

(51) Int. Cl.
    *G01N 30/58*        (2006.01)
    *G01N 30/60*        (2006.01)

(58) Field of Classification Search
    CPC ... B01J 20/281; G01N 30/58; G01N 30/6065;
                                          G01N 30/60
    USPC ...................................................... 210/198.2
    See application file for complete search history.

(56)               References Cited

U.S. PATENT DOCUMENTS

| | | | |
|---|---|---|---|
| 7,261,812 B1 | 8/2007 | Karp et al. | |
| 7,482,169 B2 | 1/2009 | Gjerde et al. | |
| 2004/0107023 A1 | 6/2004 | Meldgaard et al. | |
| 2016/0271520 A1* | 9/2016 | Hofmann | ................. C07K 1/22 |

FOREIGN PATENT DOCUMENTS

| | | | | | |
|---|---|---|---|---|---|
| EP | 1165201 B1 | | 2/2007 | | |
| EP | 2059540 B1 | | 12/2012 | | |
| GB | 661560 A | * | 2/1949 | | |
| JP | 60136704 U | | 9/1985 | | |
| JP | 2015143705 A | | 8/2015 | | |
| WO | 2000050144 A1 | | 8/2000 | | |
| WO | WO 00/50144 | * | 8/2000 | ............. | B01D 15/08 |
| WO | WO-2019201465 A1 | * | 10/2019 | ......... | B01D 15/1807 |

* cited by examiner

Expand     Equilibrate     Load     Wash     Elute

Linear 6 Arm (L6A) Design

Spiral 6 Arm (S6A) Design

MODIFIED COLUMN FOR EXPANDED BED ADSORPTION AND METHODS OF USE THEREOF

CROSS-REFERENCE TO RELATED APPLICATIONS

This disclosure is a national phase entry application of Patent Cooperation Treaty Application No. PCT/CA2020/051663, filed Dec. 4, 2020, which claims the benefit of U.S. provisional application No. 62/944,579, filed Dec. 6, 2019, the contents of which is incorporated herein by reference in its entirety.

FIELD

The present disclosure generally relates to columns for expanded bed adsorption and to methods of chromatographic separation using the same. In particular, the present disclosure relates to a modified column where the cross-sectional area of the column increases in an area near the end of the column in a flared manner.

BACKGROUND

Expanded Bed Adsorption (EBA) is a chromatographic process where desired proteins are purified from feed material. A column containing adsorbent particles is expanded by applying an upward liquid flow to the column such that a stable fluidized bed is formed with the adsorbent particles suspended in equilibrium between the particle sediment velocity and upward liquid flow velocity. Feed material is applied to the expanded bed and target proteins bind to the adsorbent while cell debris, cells and contaminants pass through.

Simulated Moving Bed (SMB) chromatography is a chromatographic technique based on a flow of liquid (mobile phase) moving countercurrent to a constant flow of solid (stationary phase). Countercurrent flow increases the potential for the separation thereby enhancing the efficiency of the process compared to traditional batch chromatography. It also allows a continuous flow of feed material to be separated. As a result, large quantities of highly purified material can be produced at a significantly reduced cost.

Traditional EBA columns, which require manual operation, including raising and lower the outlet collector as the height of the fluidized bed moves up and down to avoid the particles exiting the column, can be difficult to use in a continuous SMB process. An improved version of an EBA column which can be used, for example, in a continuous SMB process is desired.

SUMMARY

A modified chromatography column having a variable cross-sectional area has been developed. The column may be used in an Expanded Bed Adsorption (EBA) and/or a Simulated Moving Bed (SMB) chromatography process. In particular, the modified column has a uniform cross-sectional area for a portion of the column, then increases in an area near the upper end of the column in a "flared" manner, such that the end of the column is of a larger cross-sectional area. This design may decrease the linear flow velocity of the chromatographic media and minimize the exit of particles from the column.

Accordingly, the present disclosure provides a chromatography column comprising:

a tubular housing for containing a chromatographic media, the tubular housing comprising a vertical main shaft, a lower end and an upper outwardly flared region, the lower end and the upper outwardly flared region separated by the main shaft;

an inlet for providing a fluid to the lower end; and an outlet for collecting eluted material.

In one embodiment, the outlet extends from the upper outwardly flared region.

In another embodiment, the upper outwardly flared region has a bottom end and a top end, the top end having a larger diameter than the bottom end. Optionally, the diameter of the bottom end is the same as the diameter of the main shaft, and the diameter of the top end is at least 1.1, 1.2, 1.3, 1.4 or 1.5 times the diameter of the main shaft.

In one embodiment, the chromatography column further comprises a narrowing flared region extending from the top end of the outwardly flared region.

In one embodiment, the narrowing flared region extends at an angle of 5 to 20 degrees from the horizontal, optionally 8 to 12 degrees from the horizontal.

In another embodiment, the outlet extends from the narrowing flared region.

In another embodiment, the upper outwardly flared region extends from the main shaft at an angle of 1 to 50°, optionally 2 to 12°, 3 to 10°, 15 to 50° or 20 to 45° from the main shaft.

In another embodiment, the inlet is operably connected to fluid distributor. Optionally, the fluid distributor is a static fluid distributor.

In another embodiment, the chromatographic media comprises a fluidized, or expanded, particle bed.

In another embodiment, the outlet is operably connected to a collector for collecting the eluted material and wherein the collector is located at a fixed position in the column.

The present disclosure also provides an expanded bed adsorption (EBA) system comprising a chromatography column as described herein.

The present disclosure also provides a simulated moving bed system (SMB) comprising a chromatography column as described herein.

The disclosure also provides a method of purifying target molecules from a mixture comprising the target molecules and unwanted components, comprising:

a) providing a fluid comprising the target molecules and the unwanted components to a chromatography column as described herein, b) contacting the fluid with the chromatographic media, and c) eluting the target molecules from the chromatographic media.

In one embodiment, the chromatographic media comprises particles and prior to providing the fluid, the particles are fluidized to expand the media from a settled bed to an expanded bed.

In another embodiment, the particles are fluidized by providing a fluidization buffer to the column using a static distributor.

In another embodiment, the expansion ratio of the height of the expanded bed over the height of the settled bed is maintained between 1.8 and 2.5, optionally 2 and 2.3, throughout steps a) to c).

In another embodiment, the fluid is provided to the column at a variable rate.

In another embodiment, eluting comprises collecting an eluate comprising the target molecules from a fixed position in the column.

The present disclosure also provides a use of a chromatography column as described herein for purifying target molecules from a mixture comprising the target molecules and unwanted components.

Other features and advantages of the present disclosure will become apparent from the following detailed description. It should be understood, however, that the detailed description and the specific examples while indicating embodiments of the disclosure are given by way of illustration only, since various changes and modifications within the spirit and scope of the disclosure will become apparent to those skilled in the art from this detailed description.

BRIEF DESCRIPTION OF THE DRAWINGS

FIG. 11 (A-L) shows area under the curve (AUC) calculations for the conductivity during liquid changeover.

DETAILED DESCRIPTION

I. Definitions

Figure 1:
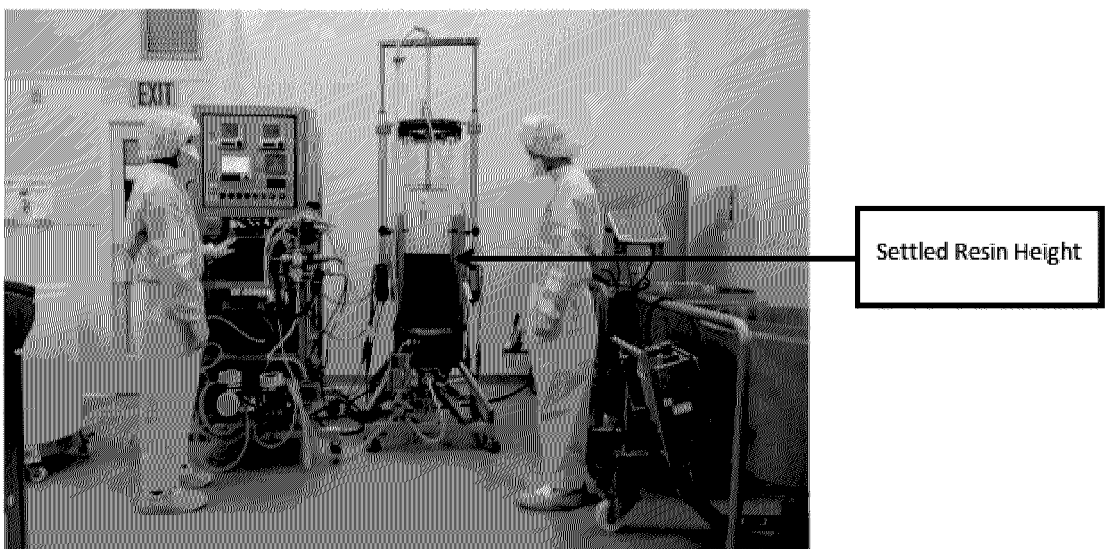
FIG. 1 shows an original commercial scale EBA column design.
Figure 1:

Unless otherwise indicated, the definitions and embodiments described in this and other sections are intended to be applicable to all embodiments and aspects of the disclosure herein described for which they are suitable as would be understood by a person skilled in the art.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

As used in this application, the singular forms "a", "an" and "the" include plural references unless the content clearly dictates otherwise.

II. Columns

In the field of Expanded Bed Adsorption (EBA) chromatography, chromatographic media may be sensitive to linear flow velocity. In particular, as the chromatographic media expands (increases in volume), the fluid level of the column can rise. A "flared" end portion of the column can reduce changes in fluid level height as expansion occurs. Such a design can minimize the amount of operator interference required during chromatography. It can also reduce the likelihood of resin and or fines (low density and/or highly mobile small or fragmented resins) from exiting the column.

Accordingly, the present disclosure provides a modified column for performing chromatography (also referred to herein as a "chromatography column"). In particular, the modified column has a uniform cross-sectional area for a portion of the column, then the cross-sectional area increases near the end of the column in a "flared" manner, such that the end of the column is of a larger cross-sectional area than the rest of the column. Portions of the column with increased cross-sectional areas may have a reduced internal linear flow rate.

Figure 2:
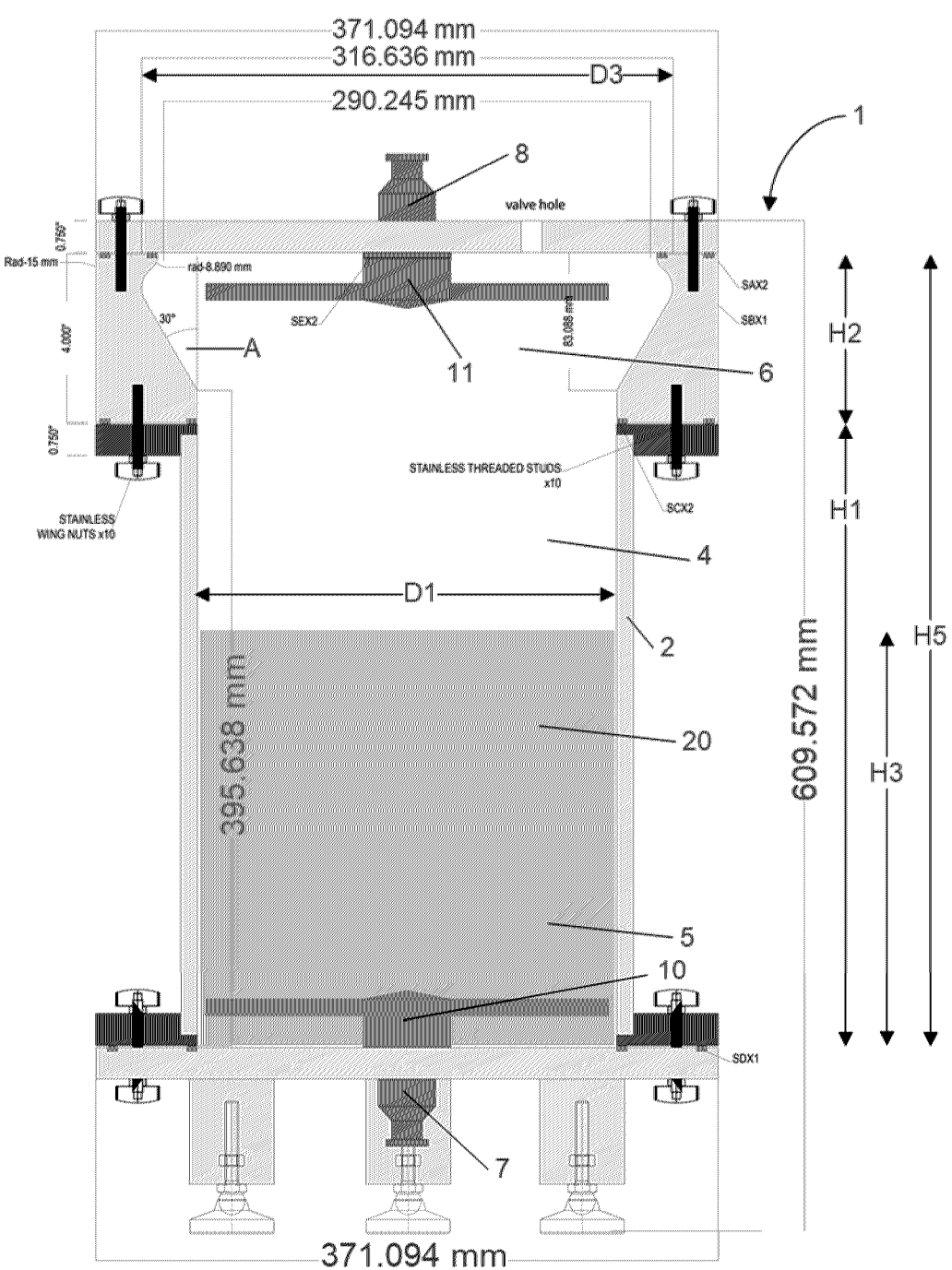
FIG. 2 shows a modified commercial scale EBA column with a flared top.

FIG. 2 shows an aspect of a column of the present disclosure. Accordingly, in an embodiment, the chromatography column 1 comprises a tubular housing 2, the tubular housing defining a housing interior for containing a chromatographic media.

The tubular housing 2 comprises a vertical main shaft 4, a lower end 5 and an upper outwardly flared region 6 (also referred to herein as the "outwardly flared region"), where the lower end 5 and the upper flared region 6 are separated by the main shaft 4. Main shaft 4 has a consistent diameter, whereas the diameter of the upper outwardly flared region 6 increases as the outwardly flared region extends from the main shaft, thereby resulting in a "flared" or "conical shape".

The outwardly flared region 6 extends from the vertical main shaft 4 at a flare angle A. The larger the flare angle, the faster the diameter of the upper outwardly flared region increases as it extends from the main shaft. In one embodiment, flare angle A ranges from 1 to 50 degrees, optionally 2 to 12 degrees, 3 to 10 degrees, 15 to 50 degrees or 20 to 45 degrees. In other embodiments, flare angle A is 2, 3, 4, 5, 6, 7, 8, 9, 10, 11, 12, 13, 14, 15, 20, 25, 30, 35, 40, 45 or 50 degrees.

In another embodiment, the diameter D3 of outwardly flared region 6 at its largest point (i.e., the top end of the outwardly flared region) is 1.1 to 5 times the diameter D1 of the main shaft, optionally 1.2 to 2 times, 1.1 to 4 times or 1.1 to 3 times the diameter of the main shaft.

In one particular embodiment, the diameter D3 of the outwardly flared region at its largest point is 1.4 times the diameter of the main shaft 4 and extends at an angle of 30° from the main shaft.

Various heights of the main shaft 4 are contemplated herein. In one embodiment, the height H1 of the main shaft 4 is 10 to 100 centimeters, optionally 15 to 45 centimeters or 20 to 30 centimeters.

Various diameters of the main shaft 4 are contemplated herein. In one embodiment, the diameter D1 of the main shaft 4 is 2 to 50 centimeters, optionally 2 to 8 centimeters or 15 to 35 centimeters.

Various heights of the outwardly flared region 6 are also contemplated herein. In one embodiment, the height H2 of the outwardly flared region 6 is 2.5 to 20 centimeters, optionally 5 to 15 centimeters.

The diameter of the outwardly flared region increases from the bottom end of the outwardly flared region (where it connects to the main shaft) to the top end of the outwardly flared region. The diameter of the bottom end of the outwardly flared region is the same, or similar to the diameter of the main shaft 4. In one embodiment, the diameter of the bottom end of the outwardly flared region 6 is 3 to 50 centimeters, optionally 15 to 35 centimeters.

The diameter D3 of the outwardly flared region is larger than the diameter of the main shaft 4. In one embodiment, the diameter D3 of the outwardly flared region 6 is 8 to 70 centimeters, optionally 25 to 45 centimeters.

The column is designed to hold a chromatographic media, normally in the form of a resin. The resin can comprise particle (or beads) of various materials and sizes. Suitable resins are known in the art. Examples of resins include, but are not limited to, MABDirect Resin (tungsten carbide-agarose beads, median particle size distribution range: 90-110 µm; density: 2.8-3.2 g/mL; ligand: p-aminobenzoic acid) and FastLine DEAE Resin (tungsten carbide-agarose beads; median particle size distribution range: 110-140 µm; density: 2.8-3.2 g/mL; ligand: DEAE).

The resin can be present in one of two forms in the column: a packed or sedimented form (also referred to herein as a "settled bed") and an expanded, or fluidized form. In the fluidized form, the particles of the resin are suspended in a fluid such as a buffer. When fluidized, the particles form an "expanded bed" (also referred to herein as a "fluidized bed") in the column.

In one embodiment, the height H3 of the settled bed is 30-60% the height H1 of the main shaft, optionally 35%-55% or 40-50% the height H1 of the of the main shaft.

In another embodiment, the height of the expanded bed is 75-100% the height H5 of the column, optionally 85-99% or 85-95% the height H5 of the column.

As used herein, the term "expansion ratio" refers to the expanded bed height/settled bed height. In one embodiment, the expansion ratio of the chromatographic media is 1.8 to 2.5, optionally 2 to 2.3.

A settled bed 20 is depicted in FIG. 2 having a height H3. The area above the bed is referred to as the headspace. The height H4 of the headspace is optionally 1-10 centimeters above the expanded bed and 10-40 centimeters above the settled bed.

In one embodiment, the height H4 of the headspace does not vary more than the height H2 of the outwardly flared region during operation of the column.

Example of buffers that can be used for fluidizing the particles include, but are not limited to, 1M NaOH, WFI, 1M NaCl, 2M NaCl and 3M NaCl.

Figure 14:
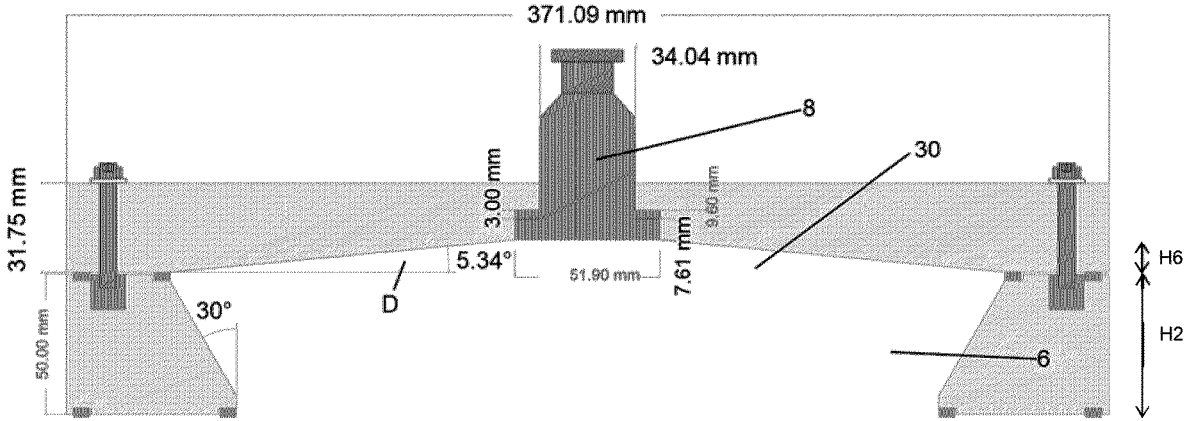
FIG. 14 shows a modified EBA column with a second narrowing flared region.
Figure 15:
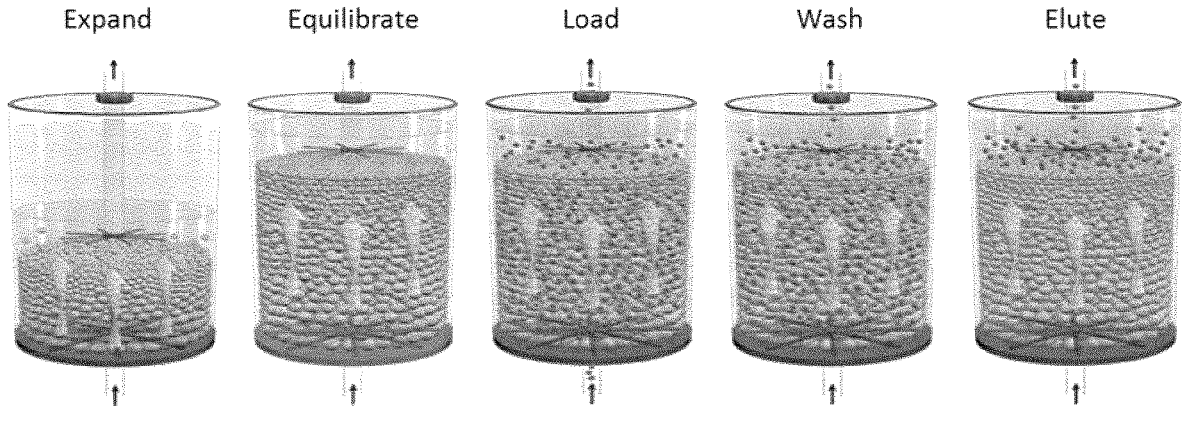
FIG. 15 shows a typical process on a standard EBA column.

In some embodiments, as shown for example in FIG. 14, a narrowing flared region 30 extends from the top end of the outwardly flared region 6. The narrowing flared region may redirect the flow toward the upper port 8.

Various heights H6 of the narrowing flared region 30 are contemplated herein.

The diameter of the narrowing flared region decreases from the bottom end of the narrowing flared region (where it connects to the top end of the outwardly flared region) to the top end of the narrowing flared region. The diameter of the bottom end of the narrowing flared region is the same, or similar to the diameter of the top end of the outwardly flared region.

The narrowing flared region 30 extends from the horizontal at a flare angle D. In one embodiment, flare angle D ranges from 5 to 20 degrees from the horizontal, optionally 8 to 12 degrees from the horizontal. In other embodiments, flare angle 6 is 8, 9, 10, 11 or 12 degrees from the horizontal.

The column of FIG. 2 also includes a lower port 7 (also referred to as inlet 7) and an upper port 8 (also referred to as outlet 8).

Lower port 7 can be used, for example, to provide a fluid to the column. Examples of fluids that can be provided via the lower port include buffers, for example buffers for expanding the chromatographic media and elution buffers, wash fluids and raw material to be treated.

Upper port 8 is used, for example, to collect eluted material.

Figure 16:
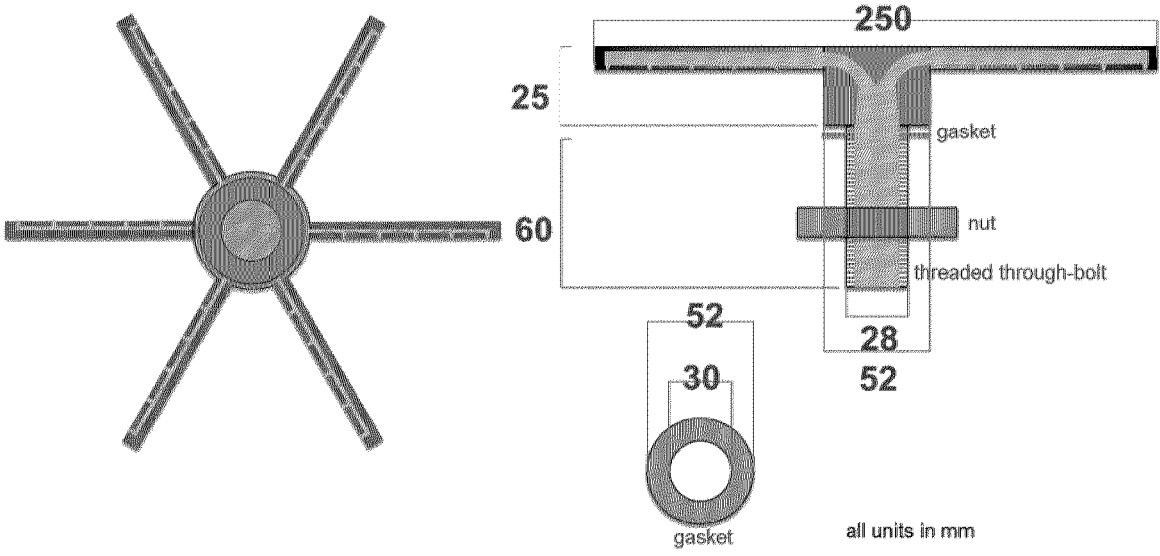
FIG. 16 shows two static fluid distributors.
Figure 16:
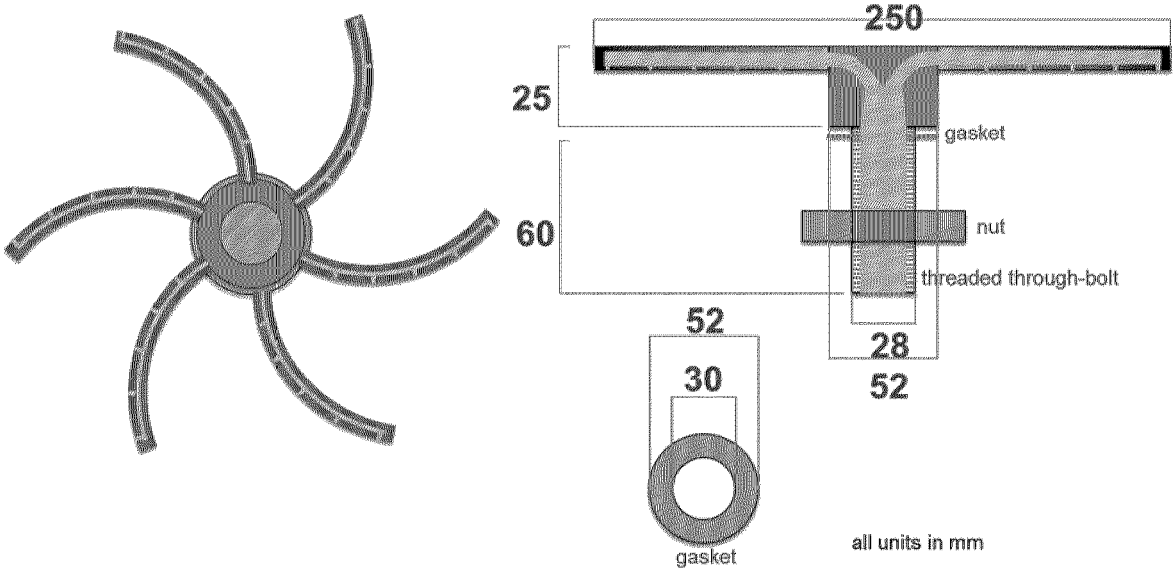

Lower port 7 is optionally operably connected to a fluid distributor 10 which distributes the fluid (for example, fluidizing buffer, elution buffer and/or feedstock) to the column. In one embodiment, the fluid distributor 10 is a static distributor. In another embodiment, the fluid distributor 10 is a non-static distributor. A static (non-moving) distributor is differentiated from a non-static distributor such as a motorized rotating distributor. In one embodiment, the fluid distributor is adapted to deliver a uniform flow of fluid to the column. The fluid disruption optionally comprises multiple arms projected from a central distributor line, each adapted to provide fluid to the column. The arms are optionally straight (as shown for example in FIG. 16, upper) or curved (as shown in FIG. 16, lower).

Upper port 8 can extend from the top end of outwardly flared region 6. Where the column includes a narrowing flared region 30, upper port 8 can extend from the top end of narrowing flared region 30. Upper port 8 may be operably connected to a collector 11.

Collector 11 is optionally positioned at a fixed height in the column. In one embodiment, collector 11 is positioned at a fixed height of 1 to 6 centimeters, optionally 2 to 5 centimeters above the expanded bed.

A column of the present disclosure is optionally adapted for use in an Expanded Bed Absorption (EBA) system. Accordingly, the present disclosure also provides an EBA system comprising a column as described herein.

A column of the present disclosure is optionally adapted for use in a Simulated Moving Bed (SMB) system. Accordingly, the present disclosure also provides an SMB system comprising a column as described herein.

III. Methods and Uses

The present disclosure also includes a method of purifying target molecules from a mixture comprising the target molecules and unwanted components, comprising:

a) providing a fluid comprising the target molecules and the unwanted components to a chromatography column of the present disclosure, b) contacting the fluid with the chromatographic medium, c) eluting the target molecules from the chromatographic medium.

In an embodiment, the target molecule is protein.

In another embodiment, the unwanted components include cells, cell debris, containments and/or undesired protein.

In one embodiment, the fluid is plasma, optionally human plasma, and the target molecule is a plasma protein, optionally IVIG, albumin or alpha-1 antitrypsin (AAT).

In another embodiment, the target molecule is IgA, IgM, IgD, IgE, α-1-proteinase inhibitor, blood pro-coagulation protein, blood anti-coagulation protein, thrombolytic agent, anti-angiogenic protein, α-2-antiplasmin, C-1 esterase inhibitor, apolipoprotein, HDL, LDL, Fibronectin, beta-2-glycoprotein I, fibrinogen, plasminogen, plasmin, plasminogen activator, plasminogen inhibitor, plasma protease inhibitor, thrombin, anti-thrombin III, streptokinase, inter-alpha-trypsin inhibitor, α-2-macroglobulin, amyloid protein, ferritin, pre-albumin, GC-globulin, haemopexin, C3-complement, transferrin, urokinase, α-1-acid-glycoprotein, and a coagulation or anti-coagulation factor selected from the group consisting of Factor II, Factor V, Factor VII, Factor VIII, von Willebrand factor, Factor VIII-von Willebrand factor complex, Factor IX, Factor X, Factor XI, C1 inhibitor, protein C and Protein S.

In one embodiment, the chromatographic medium comprises a resin. The method optionally further comprises fluidizing the resin to provide an expanded bed (e.g., expanding the settled bed to the expanded bed) prior to providing the fluid. The resin is optionally fluidized by providing a fluidization buffer to the column. Various fluidization buffers are known in the art and include, but are not limited to, 1M NaOH; WFI; 1M NaCl; 2M NaCl; 3M NaCl; 0.1 M NaOH; 0.5 M NaCi; 20 mM NaCi; 20 mM NaCi, 0.6 M NaCl; 0.1 M KH$_2$PO$_4$; 5 mM KH$_2$PO$_4$; 10 mM NCP, 10 mM EACA; 0.2 M KH$_2$PO$_4$, 0.5 M NaCl, 10 mM EACA (pH 7.80); 0.2 M KH$_2$PO$_4$, 0.5 M NaCl, 10 mM EACA (pH 4.50); 265 mM glycine (pH 4.15); 5 mM NaOAc (pH 5.75); 5 mM NaOAc, 1 M NaCl; 0.5 M NaOAc (pH 5.25); 0.15 M NaOAc (pH 5.25); 10 mM NaOAc, 300 mM NaCl; 25 mM NaOAc (pH 5.20); 5 mM NaAce (pH 4.50); 10 mM KH$_2$PO$_4$, 80 mM NaCl; 0.1 M NaOH, 1 M NaCl; 50 mM NaCl and 60 mM NaHCO$_3$.

In one embodiment, the method further comprises rinsing the chromatography column to remove at least some of the unwanted materials prior to eluting the target molecules. This step may be performed after contacting the fluid with the chromatographic media and before eluting the target molecules from the chromatographic media. Examples of rinsing fluids which may be used to rinse the column include, but are not limited to, 20 mM NaCi; 5 mM KH$_2$PO$_4$; 10 mM NCP, 10 mM EACA; 0.15 M NaOAc (pH 5.25) and 25 mM NaOAc (pH 5.20).

In one embodiment, "eluting the target molecule" comprises providing a suitable elution buffer to the column and subsequently collecting eluate comprising the target molecule from the column. The eluate may be collected for example from an outlet collector such as outlet collector 8 of FIG. 2. In one embodiment, eluate is collected from a fixed position in the column. In other words, a collector with an adjustable height is not required.

In the present methods, liquids including, but not limited to, fluidization buffers, rinsing fluids, elution buffers and fluid comprising the target molecules and the unwanted components, are provided to the column using a distributor, optionally a static distributor.

The column of the present disclosure can allow operation of the column with a constant, or relatively constant expansion ratio (expanded bed height/settled bed height). In one embodiment, the expansion ratio of the chromatographic media is maintained between 1.8 to 2.5, optionally 2 to 2.3 during operation.

Keeping the height of the expanded bed constant, or relatively constant, means that the height of the collector can be maintained at a fixed height throughout the process. Thus, in another embodiment, collector 8 is maintained at a fixed height of 1 to 6 centimeters, optionally 2 to 5 centimeters, above the expanded bed.

The flow rate of the liquids which are provided to the column can be varied such that the expansion ratio remains constant, or relatively constant throughout the separation process.

In another embodiment, prior to providing the fluid, a buffer is provided to the column to fluidize the chromatographic media.

In one embodiment, the method is performed on a continuous basis. For example, the method may be performed without any manual adjustment of the height of the collector. For example, the method may optionally be performed as part of a simulated moving bed (SMB) system.

As is known in the art, a SMB system combines a series of columns in a contiguous flowpath whereby feedstocks are added to the system and target molecules collected in a continuous operation. This operation may be achieved through timed injection and flowpath diversion of product and buffers through a series of columns in a sequential fashion.

The following non-limiting examples are illustrative of the present disclosure:

Examples

A flared top Expanded Bed Adsorption (EBA) chromatography column was found to reduce the probability of chromatographic medium (resin) and fines making their way into the outlet line during operation and reduce the risk of overexpansion when there is an increase in flow rate or increase in fluid viscosity running through the column. The effects of different head space volumes for buffer exchange were also investigated.

I. Introduction

FIG. 1 is an example of a large scale EBA column design, which was used for clinical manufacturing of PlasmaCap IG. The outlet collector is submerged in the liquid above the expanded bed. Throughout the process, liquids with varying physical and chemical properties are passed through the column. The height of the expanded bed is permitted to increase and decrease as the liquid properties change.

The outlet tube is manually raised and lowered to maintain approximately 3-5 cm of liquid above the changing bed height. If the outlet is not raised in conjunction with the expanded bed, chromatographic media will exit through the column via the outlet and be contained in product pools. If the outlet is not lowered in conjunction with the expanded bed, higher volumes would be required to recover product, resulting in the product being excessively diluted. Furthermore, fines of chromatographic media that are of the lowest size and density can also leave the column if there is a disturbance in the bed. This is of particular concern during liquid changeover when buffers are of different viscosities are used. A cloud of fines can persist above the main bed height for a longer duration of time which can enter the outlet line.

An improved version of the original EBA column is desired for use in a continuous simulated moving bed (SMB) system. To use an EBA column in an SMB system, two main issues need to be dealt with. First, the manual nature of running an EBA column will need to change to an autonomous nature. Secondly, the probability of resin being able to enter the outlet line needs to be reduced.

In FIG. 2, a modified commercial scale EBA column with a flared top design may be seen. The top of the column is a closed system where the top is physically closed from the external environment and directed to a closed tubing flowpath without being exposed to air. This eliminates the need for a secondary pump on the outlet line.

Operating the column with constant expansion and variable flow in place of variable expansion also eliminates the need for a collector with adjustable height. It is easier to operate the column, without having to manually increase or decrease the height of the outlet line during the operation and minimizes the risk of human error in the adjustment. This design is more suitable for use on a continuous SMB system since no parts will need to be manually adjusted.

The top flared region (also referred to herein as the "upper outwardly flared region") of the column is shaped like a truncated cone with the diameter of the top being larger than the diameter of the bottom.

As described below, the increase in diameter caused a decrease in linear flow from the shaft area to the top of the column where collection occurs. It was also shown that with a decrease in linear flow rate, the likelihood of resin fines rising up to the opening area is reduced. Additionally, the introduction of a horizontal flow vector reduced the risk of overexpansion with changes to flow or fluid properties. It was also shown that a smaller headspace leads to a better exchange efficiency.

Procedure

Figure 10:
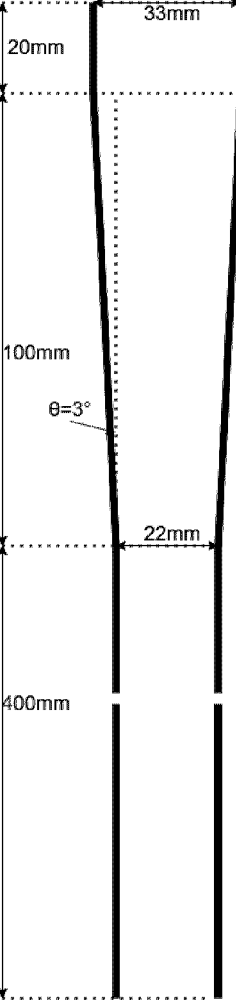
FIG. 10 shows a modified EBA column with flared top-3° flare angle. Volume of top cone region=77.29 mL.
Figure 11A:
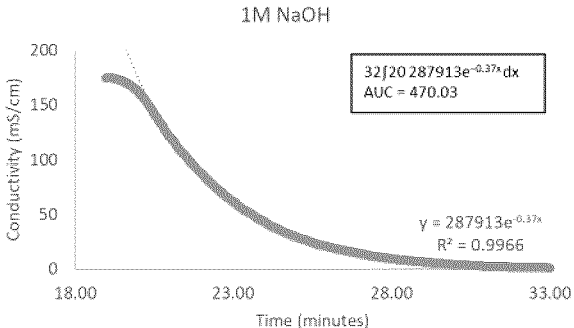
FIG. 11A shows the AUC for 1M NaOH in a 3° flare modified column.
Figure 11B:
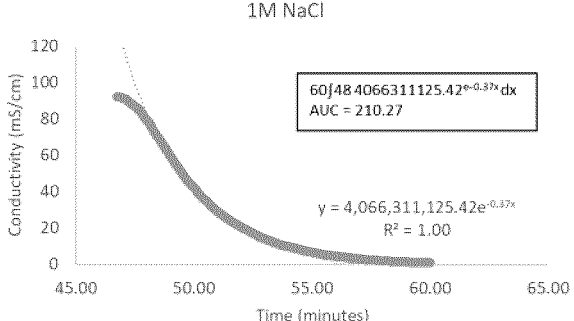
FIG. 11B shows the AUC for 1M NaCl in a 3° flare modified column.
Figure 11C:
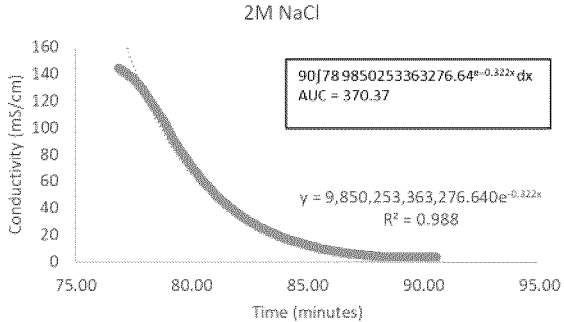
FIG. 11C shows the AUC for 2M NaCl in a 3° flare modified column.
Figure 11D:
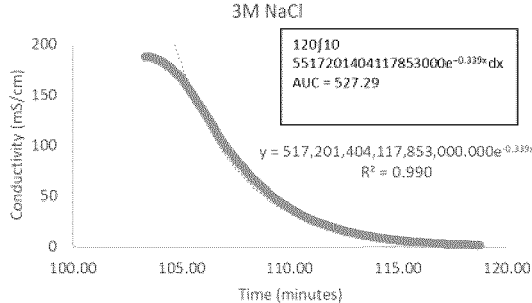
FIG. 11D shows the AUC for 3M NaCl in a 3° flare modified column.
Figure 11E:
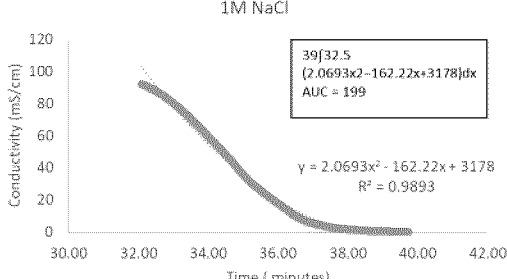
FIG. 11E shows the AUC for 1M NaCl in a 10° flare modified column.
Figure 11F:
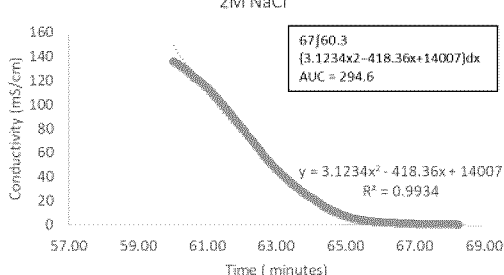
FIG. 11F shows the AUC for 2M NaCl in a 10° flare modified column.
Figure 11G:
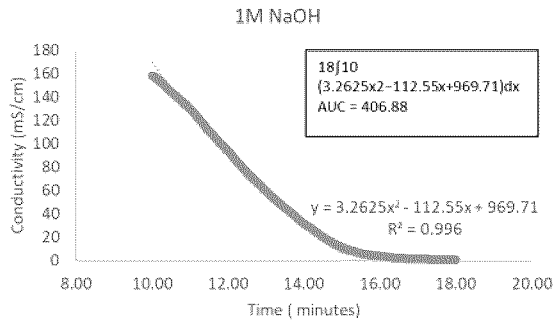
FIG. 11G shows the AUC for 1M NaOH in a 10° flare modified column.
Figure 11H:
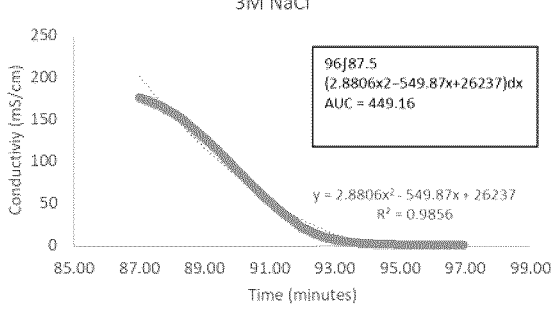
FIG. 11H shows the AUC for 3M NaCl in a 10° flare modified column.
Figure 11I:
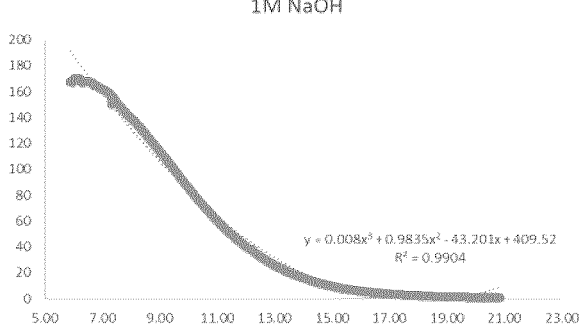
FIG. 11I shows the AUC for 1M NaOH in a standard column.
Figure 11J:
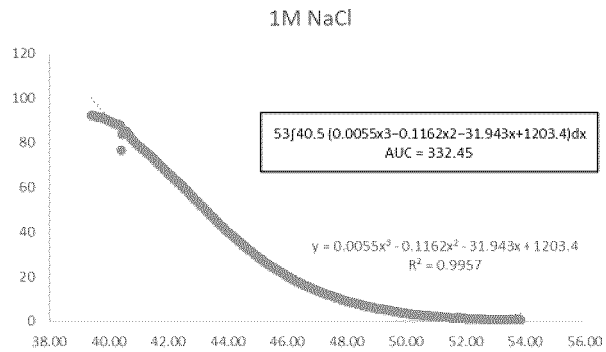
FIG. 11J shows the AUC for 1M NaCl in a standard column.
Figure 11K:
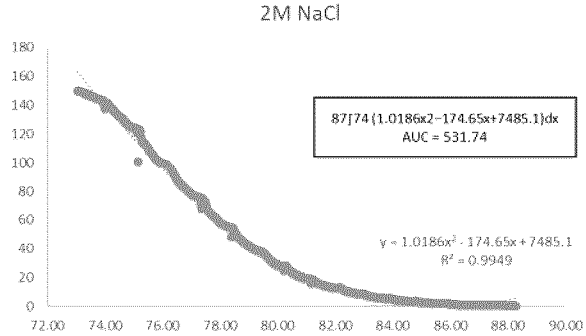
FIG. 11K shows the AUC for 2M NaCl in a standard column.
Figure 11L:
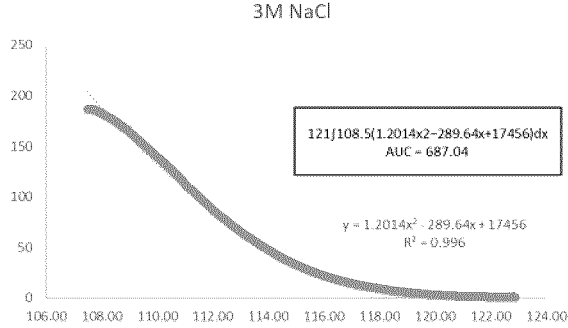
FIG. 11L shows the AUC for 3M NaCl in a standard column.
Figure 12:
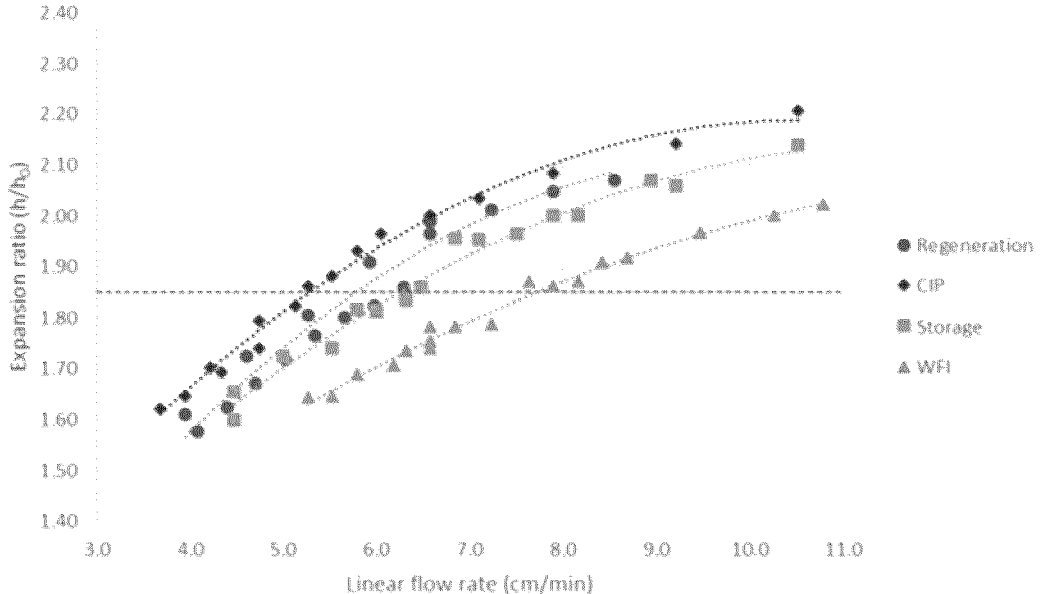
FIG. 12 shows a flow-expansion relationship for solutions common to Column A, PreD, and D. (Regeneration=1M NaCl, CIP=1M NaOH, Storage=0.1M NaOH).
Figure 13:
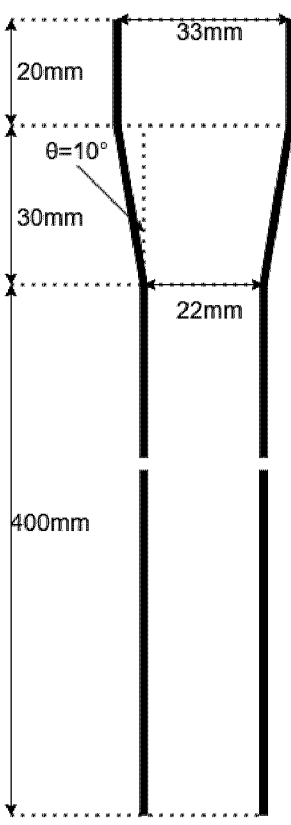
FIG. 13 shows a modified EBA column with flared top-10° flare angle. Volume of top cone region=35.15 mL.

The standard and flared column designs were compared using the available lab scale columns and EBA DEAE resin. The standard EBA column was a 2 cm diameter column, modified columns were 2.2 cm diameter columns with a 3.3 cm diameter flared top regions with flare angles of 3° and 10° (specifications shown in FIG. 10 and FIG. 13).

Procedure:

1. Assess the expansion ratio of the DEAE EBA resin on the standard EBA column, the modified EBA column with a 3° flare angle, and the modified EBA column with a 10° flare angle using a sequence of liquids with varying physical properties.

2. For all column designs, monitor the height and duration of the over expanded fine resin clouds caused by liquid changeover.

3. Assess the effects of different head space volumes on exchange efficiency comparing the various columns.

Materials and Equipment

Tables 1-3 detail the materials and equipment used in the study.

TABLE 1

| Equipment | Details |
|---|---|
| Standard EBA column (2 cm diameter) | Asset: 0007 |
| Modified EBA column (2.2 cm diameter) - 3° flare | Asset: 0155 |
| Modified EBA column (2.2 cm diameter) - 10° flare | Asset: 0159 |
| Viscometer | Gilmont Instruments: GV-2200 |

TABLE 2

| Materials | Details |
|---|---|
| DEAE Resin | RD379, Batch CS202 |

TABLE 3

| Buffers | Details |
|---|---|
| 1M NaOH | Density = 1.515 g/mL, Viscosity = 0.74 cP |
| 1M NaCl | Density = 1.069 g/mL, Viscosity = 0.91 cP |
| 2M NaCl | Density = 1.08 g/mL, Viscosity = 1.01 cP |
| 3M NaCl | Density = 1.25 g/mL, Viscosity = 1.03 cP |
| WFI | |

Methods

1. Packed columns to a settled bed volume of 20±0.5 cm according to SOP-E-015 Column Packing and Unpacking but using 1M NaOH as the packing buffer. The modified 3° and 10° flare angle columns were packed to 20 cm, and the standard column was packed to 19.5 cm.

2. Installed the inline conductivity meter to the outlet line of the column.

3. The flow rate was set to a pre-determined flow rate to expand the resin 2× (with 1M NaCl). 30 mL/min for modified columns, and 27 mL/min for the standard column.

4. Buffer was run through the column at the above flow rate.

5. The height of the resin bed was recorded throughout the expansion at regular intervals and the expansion ratio was determined. Conductivity data was recorded.

6. Sufficient time was permitted for the expansion to reach its new steady state.

7. If a fine resin cloud was seen during the exchange, its height was recorded along with the time it took for the cloud to reduce down to the main resin bed height. A photo was taken of any residual fines that resided in the outlet beaker to qualitatively measure how much resin was lost.

8. Steps 4-7 were repeated until all specified buffers were run through the column.

Figure 3:
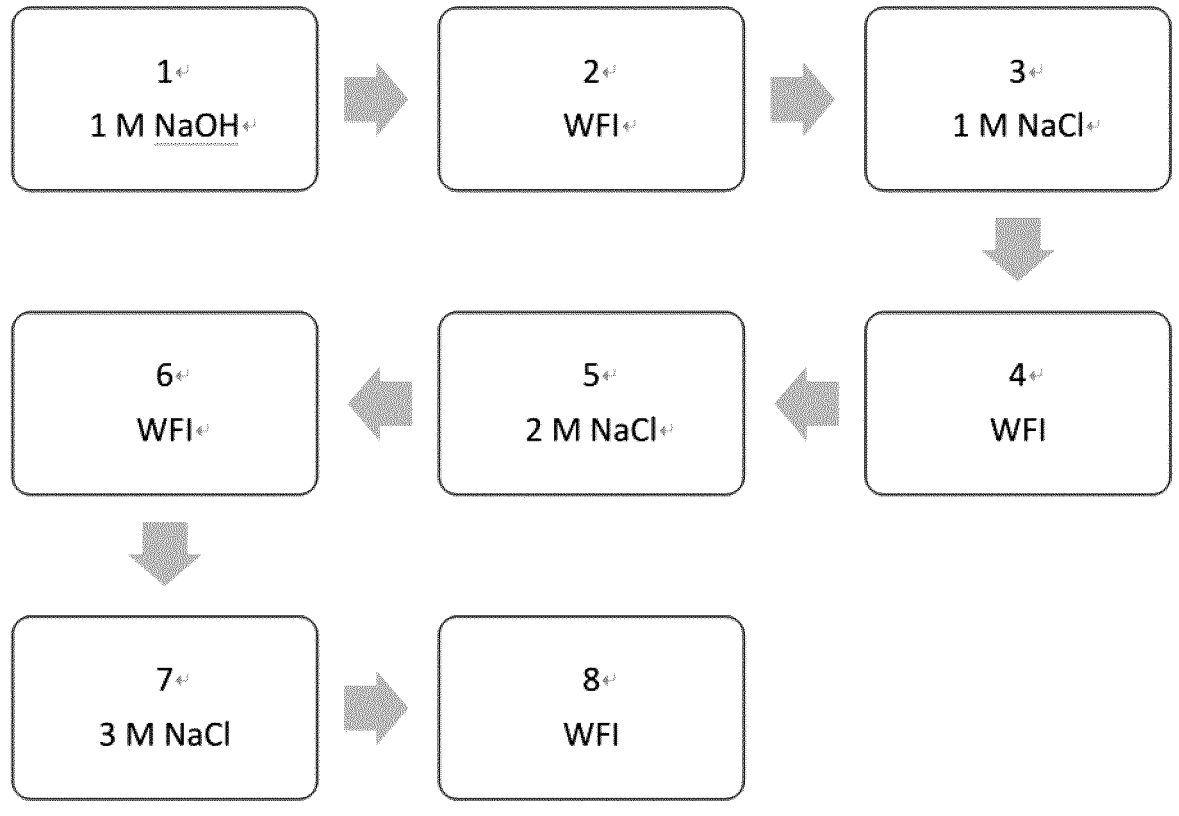
FIG. 3 shows the order of buffers used in Example 1.

The buffers were used in the order outlined in FIG. 3. 1M NaOH began since it is what the resin was initially packed in. WFI followed NaOH and NaCl so that a low concentration buffer could follow a high concentration buffer. Significant lifting of the resin was expected to occur, and so this was noted to characterize the difference in fine resin clouds between the three column designs. If resin entered the outlet line it was noted and the resin was pumped back into the column at the end of the sequence.

The modified columns had a fixed head space of 3 cm for the 10° flare column and 10 cm for the 3° flare column. A fixed headspace of 10 cm was used for the standard EBA column (above the 2× resin expansion line).

Results and Discussion

The following sections review the expansion ratios of the DEAE EBA resin on the standard EBA column, the modified EBA column with a 3° flare angle, and the modified EBA column with a 10° flare angle using a sequence of liquids with varying physical properties. They also review the height and duration of the over expanded fine resin clouds caused by liquid changeover. The effects of different head space volumes on exchange efficiency of the various columns are also assessed.

The Expansion Ratio of the Resin Bed

Figure 4:
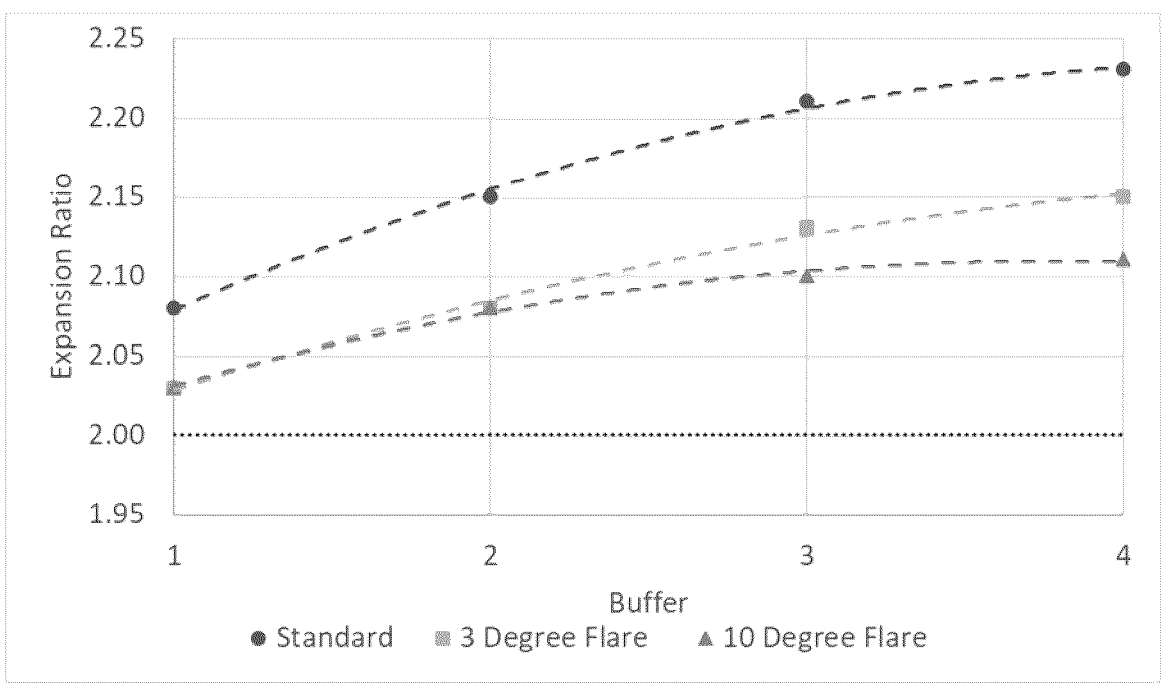
FIG. 4 shows steady state expansion ratios for a standard EBA column, a modified EBA column with a 3° flare, and a modified EBA column with a 10° flare.

In FIG. 4, the steady state expansion ratios for the standard EBA column, and the modified EBA columns with 3° and 10° flares may be seen. Shown by the circle markers, the standard EBA column had the highest expansion ratio levels. The modified EBA column with a 3° flare angle, shown by the square markers, had the second highest expansion ratios. Shown by the triangle markers, the modified EBA column with a 10° flare angle had the lowest expansion ratios. The larger the flare angle the faster the column diameter increases, and the smaller the expansion ratio of the resin bed. Some properties about the sequence of buffers used may be seen in Table 4 below. The most reliable factor for determining how much the resin will expand was the conductivity. The expansion ratio reliably increased when the conductivity increased. Density and viscosity had a clear linear and increasing trend on bed height as well when 1 M NaCl to 3 M NaCl were analysed, but the trend was not as reliable when 1 M NaOH accounted for.

TABLE 4

| Buffer Properties | | | |
| --- | --- | --- | --- |
| Buffer | Density (g/mL) | Viscosity (cP) | Conductivity (mS/cm) |
| 1M NaOH | 1.52 | 0.74 | 176 |
| 1M NaCl | 1.07 | 0.91 | 93 |
| 2M NaCl | 1.08 | 1.01 | 148 |
| 3M NaCl | 1.25 | 1.03 | 188 |

The Expansion Ratio of the Resin Fine Cloud

Figure 5:
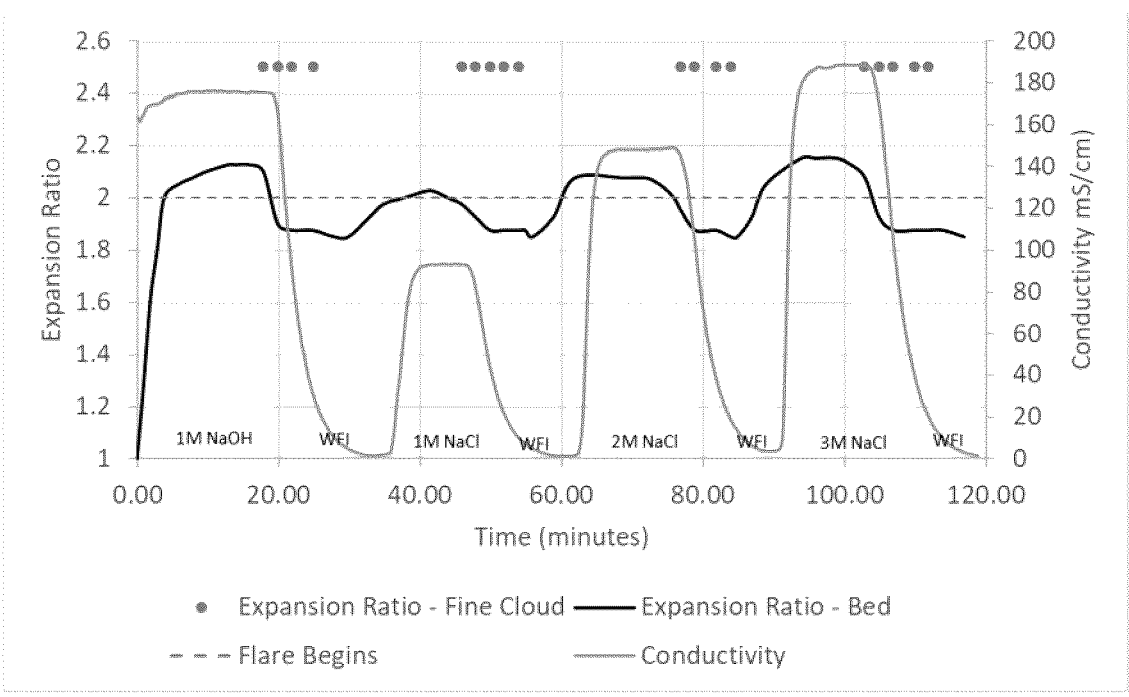
FIG. 5 shows the expansion ratio of the resin bed and fine clouds caused during liquid changeover for the modified EBA column with a 3° flare angle.

In FIG. 5, data may be seen for the expansion ratio of the resin bed and fine clouds caused during liquid changeover for the modified EBA column with a 3° flare angle. Looking at the black and grey data sets which represent resin bed height and conductivity respectively, a trend may be seen. The trend is that as the conductivity increases, bed height also increases. The higher the conductivity the higher the bed height. When the conductivity is low, the bed height is also low. However, when a high conductivity buffer immediately followed by a low conductivity buffer an interesting phenomenon happens at the interface of the resin bed and the liquid in the column. Small fines of resin get swept up in the upward flow and circulate around the top of the column. The cloud of fines (visualized by the yellow points) persists for 7-8 minutes until it slowly thins out and disperses.

Figure 6:
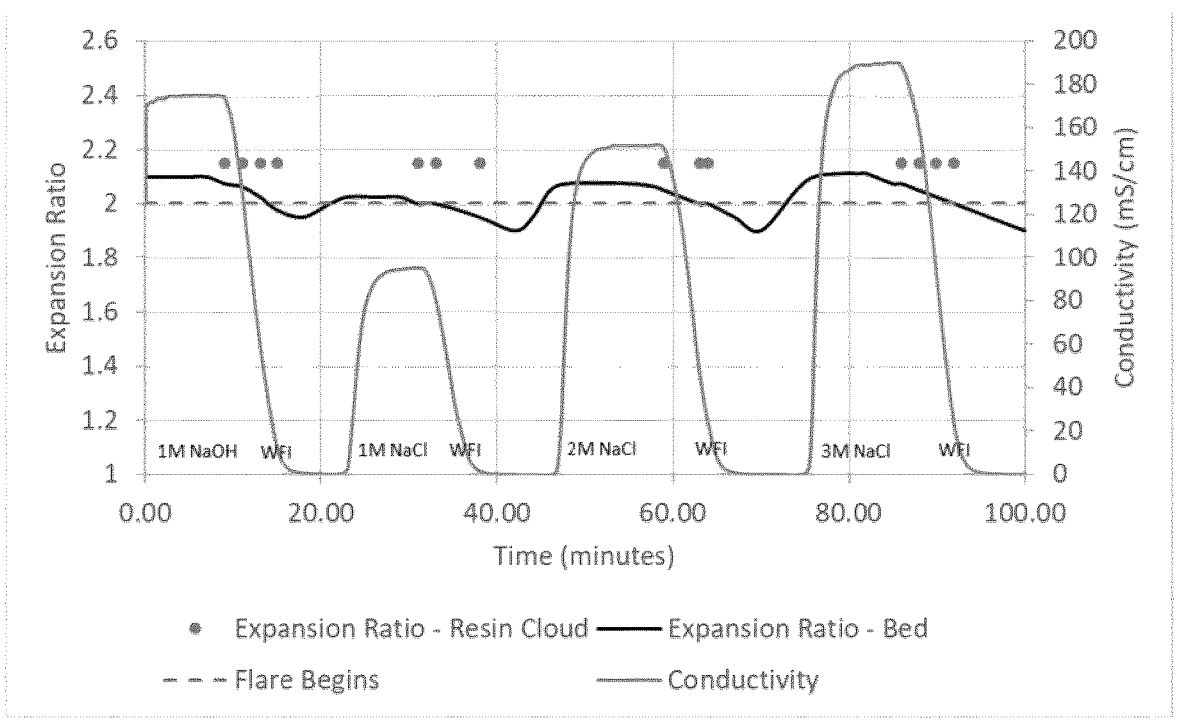
FIG. 6 shows the expansion ratio of the resin bed and fine clouds caused during liquid changeover for the modified EBA column with a 10° flare angle.

In FIG. 6, data may be seen for the expansion ratio of the resin bed and fine clouds caused during liquid changeover for the modified EBA column with a 10° flare angle. Similarly, to FIG. 5, during liquid changeover from a high conductivity liquid to WFI a fine cloud rose up to the top of the column for 7-8 minutes. The additional flare angle did not appear to have any significant difference on the amount of resin in the cloud.

Figure 7:
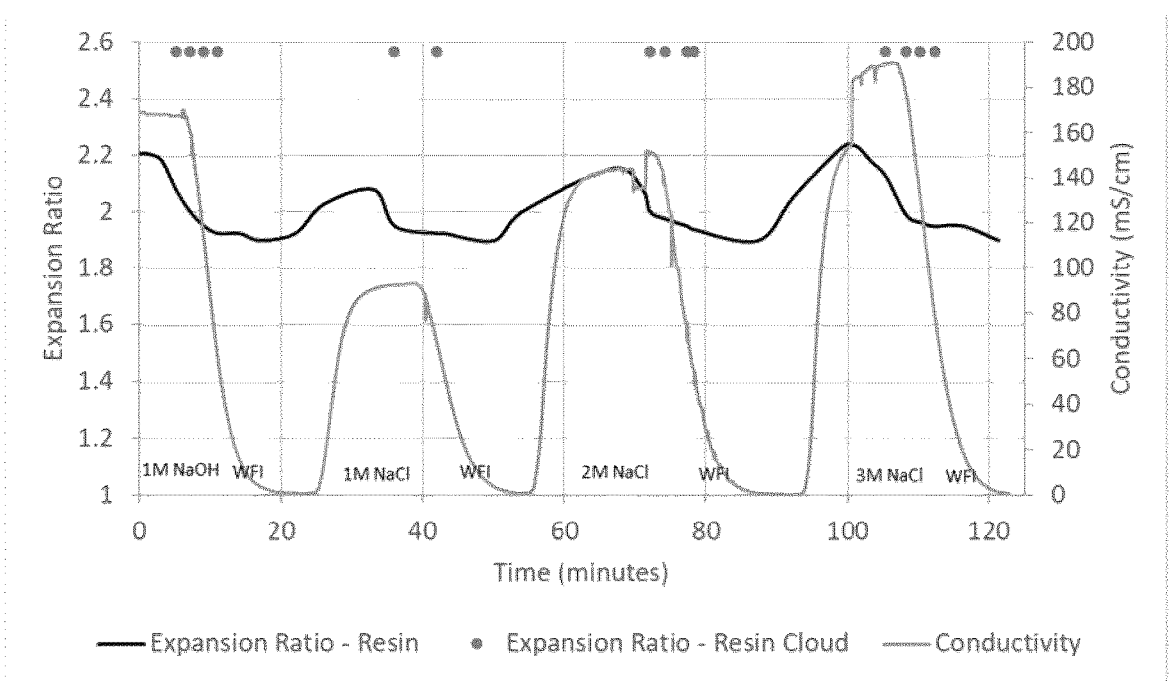
FIG. 7 shows the expansion ratio of the resin bed and fine clouds caused during liquid changeover for the standard EBA column.
Figure 8:
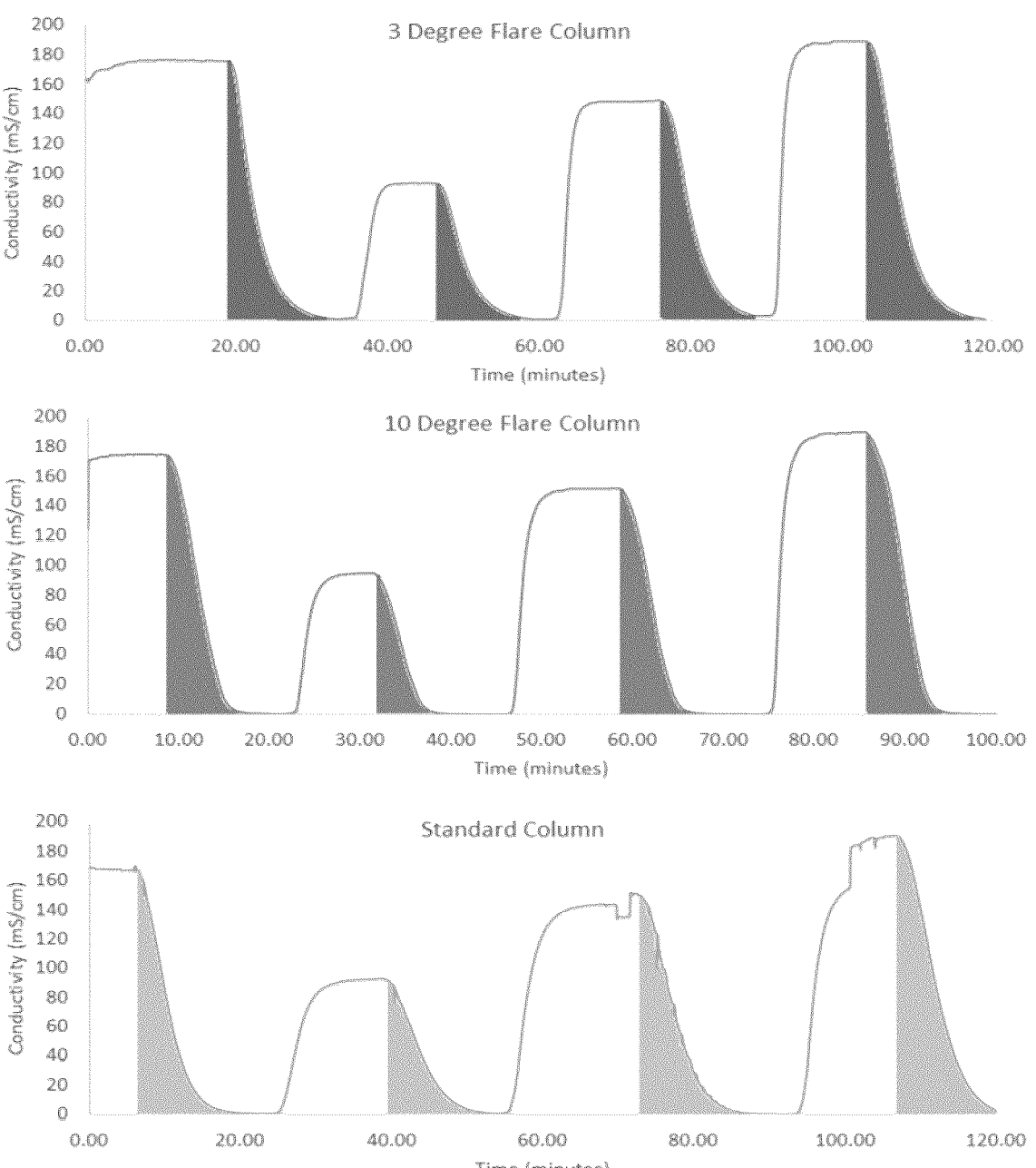
FIG. 8 shows conductivity curves for the modified EBA column with a 3° flare angle (top), modified EBA column with a 10° flare angle (center), and standard EBA column (bottom). The AUC estimated represents the time or volume of buffer required for the high conductivity buffer to be exchanged with WFI.

In FIG. 7, data may be seen for the expansion ratio of the resin bed and fine clouds caused during liquid changeover for the standard EBA column. The conductivity data set is slightly broken at certain points due to bubbles entering the system. However, the trend is the same as previous column deigns. The fine cloud rose to the top of the column during liquid changeover.

The amount of fines which made their way out of the column and into the waste beaker was also observed. There was minimal difference between the 3° flare column and the 10° flare column as a similar amount of resin made its way out of the outlet line for the modified columns. For the standard column marginally more resin was seen is in the waste container. Without being bound by theory, it is likely that the flare design reduced the amount of resins and fines which were able to make it into the outlet line.

Head Space Volume and Buffer Equilibration

The 3° flare angle column had a headspace of 10 cm and 77.29 mL, the 10° flare angle had a headspace of 3 cm and 35.15 mL, and the standard column had a maintained headspace of 10 cm and 31.42 mL.

Figure 9:
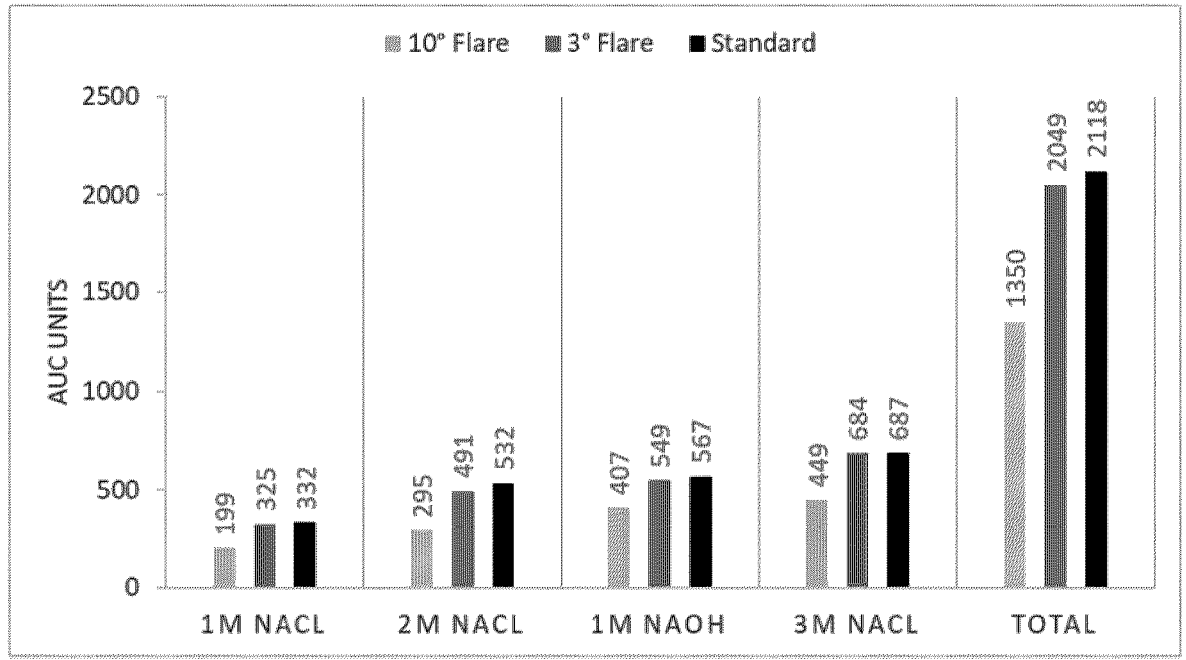
FIG. 9 shows integrated AUC for 3° and 10° flare modified columns, and the standard column.

The method used for analysis was comparing the estimated area under the curve (AUC) for the conductivity during liquid changeover. Shown in FIG. 9, the AUC's represent the amount of time or buffer required for equilibration. After doing integrations of the AUC, FIG. 10 was plotted. Calculations can be seen in FIG. 11.

It was shown that the AUC for any given liquid is lower when using the 10° flare in comparison to the 3° flared column and the standard column. The headspace difference of 3 cm versus 10 cm had the largest impact on equilibration time. In total, the 10° flare column had a total AUC which was 34% less than the 3° flare column and 36% less than standard column. It should be noted that in reality when the standard column is used, a headspace of only 3-5 cm is manually maintained, so its exchange efficiency would be similar to that of the 3° flare column.

Summary

The flare design was shown (in FIG. 4) to reduce the risk of overexpansion when there is an increase in flow rate or increase in fluid viscosity running through the column. The larger the flare angle the better the column was at reducing overexpansion. The 3° flare design was better than the standard design, and the 10° flare design was better than the 3° flare design. The flare design was shown to be better than standard EBA design for reducing the probability of fines making their way into the outlet line during operation. The effects of different head space volumes for buffer exchange was also investigated, and it was shown that the smaller the head space, the more efficient the buffer exchange. In a more typical use of the standard EBA column the headspace would be maintained at 3-5 cm, which would increase buffer exchange efficiency, however, it would also increase the amount of resin loss.

Overall, the flare design column is an improved version of the original EBA column and can be used in a continuous simulated moving bed (SMB) system.

The invention claimed is:

1. A chromatography column comprising:

a tubular housing for containing a chromatographic media, the tubular housing comprising a vertical main shaft, a lower end and an upper outwardly flared region, the lower end and the upper outwardly flared region separated by the vertical main shaft, wherein the upper outwardly flared region has a bottom end and a top end, the top end having a diameter larger than a diameter of the bottom end;

an inlet for providing a fluid to the lower end; and an outlet for collecting eluted material, wherein the outlet extends from the upper outwardly flared region, wherein the vertical main shaft has a height of 10 to 100 centimeters and a diameter of 2 to 50 centimeters and the upper outwardly flared region extends from the vertical main shaft at an angle of 20 to 45 degrees from the vertical main shaft.

2. The chromatography column of claim 1, wherein the diameter of the bottom end is the same as the diameter of the vertical main shaft, and the diameter of the top end is at least 1.1, 1.2, 1.3, 1.4 or 1.5 times the diameter of the vertical main shaft.

3. The chromatography column of claim 1, further comprising a narrowing flared region extending from the top end of the upper outwardly flared region.

4. The chromatography column of claim 3, wherein the narrowing flared region extends at an angle of 5 to 20 degrees from horizontal, optionally 8 to 12 degrees from the horizontal.

5. The chromatography column of claim 3, wherein the outlet extends from the narrowing flared region.

6. The chromatography column of claim 1, wherein the inlet is operably connected to fluid distributor.

7. The chromatography column of claim 6, wherein the fluid distributor is a static fluid distributor.

8. The chromatography column of claim 1, wherein the chromatographic media comprises an expanded bed.

9. The chromatography column of claim 1, wherein the outlet is operably connected to a collector for collecting the eluted material and wherein the collector is located at a fixed position in the chromatography column.

10. An expanded bed adsorption (EBA) system comprising the chromatography column of claim 1.

11. A simulated moving bed (SMB) system comprising the chromatography column of claim 1.

* * * * *